US008434562B2

(12) United States Patent
Miyasaka et al.

(10) Patent No.: US 8,434,562 B2
(45) Date of Patent: May 7, 2013

(54) RIPPER OPERATING DEVICE

(75) Inventors: Shuuji Miyasaka, Ibaraki (JP); Shigeru Yamamoto, Hirakata (JP); Kazuyuki Suzuki, Hirakata (JP)

(73) Assignee: Komatsu Ltd., Tokyo (JP)

( * ) Notice: Subject to any disclaimer, the term of this patent is extended or adjusted under 35 U.S.C. 154(b) by 431 days.

(21) Appl. No.: 12/680,636

(22) PCT Filed: Dec. 3, 2008

(86) PCT No.: PCT/JP2008/071965
§ 371 (c)(1),
(2), (4) Date: Mar. 29, 2010

(87) PCT Pub. No.: WO2009/075210
PCT Pub. Date: Jun. 18, 2009

(65) Prior Publication Data

US 2010/0212450 A1 Aug. 26, 2010

(30) Foreign Application Priority Data

Dec. 13, 2007 (JP) ................................ 2007-322559

(51) Int. Cl.
*A01B 39/00* (2006.01)

(52) U.S. Cl.
USPC .............................. 172/431; 180/334; 74/491

(58) Field of Classification Search .................. 172/2, 3, 172/4.5, 75, 431, 781; 74/491, 493, 523, 74/543; 180/333, 334, 335, 336, 405
See application file for complete search history.

(56) References Cited

U.S. PATENT DOCUMENTS

| | | | | |
|---|---|---|---|---|
| 4,140,200 | A * | 2/1979 | Tucek | 180/333 |
| 4,501,168 | A * | 2/1985 | Chaulk | 74/526 |
| 4,895,040 | A * | 1/1990 | Soederberg | 74/491 |
| 4,966,518 | A * | 10/1990 | Kourogi et al. | 414/700 |
| 5,042,314 | A * | 8/1991 | Rytter et al. | 74/335 |
| D331,559 | S * | 12/1992 | Kelley et al. | D12/179 |
| 5,456,333 | A * | 10/1995 | Brandt et al. | 180/336 |
| 5,488,787 | A * | 2/1996 | Aoyagi et al. | 37/348 |
| 5,768,947 | A * | 6/1998 | Fee et al. | 74/523 |
| 5,924,515 | A * | 7/1999 | Stauffer | 180/326 |
| 6,152,676 | A * | 11/2000 | Evert et al. | 414/631 |

(Continued)

FOREIGN PATENT DOCUMENTS

| | | | |
|---|---|---|---|
| AU | 766008 | B2 | 10/2002 |
| CA | 2368535 | A1 | 7/2002 |

(Continued)

*Primary Examiner* — Jamie L McGowan
(74) *Attorney, Agent, or Firm* — Global IP Counselors, LLP

(57) ABSTRACT

A ripper operating device is configured to perform operations of a ripper of a work vehicle. The ripper operating device includes a support portion, an operating lever, and an operating switch part. The operating lever is supported by the support portion to be movable with respect to the support portion in a first direction to perform a first operation and non-movable in a second direction. The first direction intersects a front-and-rear direction at an intersection point corresponding to a neutral position of the operating lever to form an acute angle with the front-and-rear direction on a rearward-outward side of the intersection point. The second direction is substantially perpendicular to the first direction and substantially matches with a direction in which a forearm of an operator extends when operating the ripper. The operating switch part is arranged on the operating lever to perform a second operation other than the first operation.

4 Claims, 7 Drawing Sheets

U.S. PATENT DOCUMENTS

| | | | | |
|---|---|---|---|---|
| 6,612,636 | B2 * | 9/2003 | Arthur et al. | 296/71 |
| 6,631,652 | B1 * | 10/2003 | Okazawa et al. | 74/471 XY |
| 6,634,453 | B2 | 10/2003 | Arthur et al. | |
| 6,650,985 | B2 * | 11/2003 | Lin et al. | 701/50 |
| 6,948,398 | B2 * | 9/2005 | Dybro | 74/471 XY |
| 6,971,194 | B2 * | 12/2005 | McClelland et al. | 37/347 |
| 7,290,635 | B2 * | 11/2007 | Bisick et al. | 180/272 |
| 7,712,571 | B2 * | 5/2010 | Proud et al. | 180/331 |
| 7,775,317 | B1 * | 8/2010 | Goodwin et al. | 180/321 |
| 7,913,798 | B2 * | 3/2011 | Frett et al. | 180/333 |
| 8,069,927 | B2 * | 12/2011 | Bachstein et al. | 172/431 |
| 2002/0166267 | A1 * | 11/2002 | McGugan | 37/348 |
| 2005/0205272 | A1 | 9/2005 | Suzuki et al. | |
| 2011/0036603 | A1 * | 2/2011 | Ruhter et al. | 172/781 |

FOREIGN PATENT DOCUMENTS

| | | | |
|---|---|---|---|
| JP | 60-184731 | U | 12/1985 |
| JP | 3-50227 | U | 5/1991 |
| JP | 8-270017 | A | 10/1996 |
| JP | 11-338568 | A | 12/1999 |
| JP | 2002-220196 | A | 8/2002 |
| JP | 2005-188276 | A | 7/2005 |

* cited by examiner

RIPPER OPERATING DEVICE

CROSS-REFERENCE TO RELATED APPLICATIONS

This national phase application claims priority to Japanese Patent Application No. 2007-322559 filed on Dec. 13, 2007. The entire disclosures of Japanese Patent Application No. 2007-322559 are hereby incorporated herein by reference.

TECHNICAL FIELD

The present invention relates to a ripper operating device to be installed on a work vehicle such as bulldozer.

BACKGROUND ART

Conventionally, a plurality of work implements such as ripper and blade are installed on work vehicles such as bulldozers. The work implements are operated by using operating levers and the like that are arranged on the both sides of an operator seat in the cab.

For example, Japanese Patent Laid-Open Publication TOKUKAI No. HEI 11-338568 (published on Dec. 10, 1999) discloses a work vehicle control device that includes a hand grip, a sidewall, a steering lever, a forward/backward changeover lever and the like arranged on an armrest arranged on the side of an operator seat.

SUMMARY

The aforementioned known device has the following problems.

That is, in the work vehicle control device disclosed in the foregoing publication, the steering lever, a gear shifting switch, the forward/backward changeover switch and the like are arranged around the hand grip, which is not swingable (movable) and is fixedly arranged on the armrest. Accordingly, an operator grasps the fixed hand grip in his/her hand so that his/her body is held, and can operate steering, gear shifting and the like with his/her thumb and fingers in with the body being held.

If this control device is applied to a ripper operating lever, the operator will actuate a lever or a switch with the tips of his/her thumb and fingers to operate a ripper. In this case, since work vehicles often intermittently receive shocks in ripping operation, actuation with the thumb or fingers of an operator in the work vehicle may deteriorate operability.

Also, a ripper operating lever is known that is configured to swing (move) in the front-and-rear direction and the right-and-left direction of a work vehicle to perform the operations of a ripper. In this configuration, since the operator operates the operating device with his/her hand and arm, operability deterioration in shocks is smaller as compared with operation with a thumb or finger, but it is difficult for the operator to hold his/her body.

It is an object of the present invention to provide a ripper operating device that ensures good operability and additionally to allow an operator to hold his/her body.

A ripper operating device according to a first aspect of the present invention is a device for performing a plurality of operations of a ripper installed on a rear side of a work vehicle, and includes a support portion, an operating lever and an operating switch part. The support portion is coupled to the work vehicle. The operating lever is supported by the support portion so as to be movable with respect to the support portion in a first direction to perform a first operation among the plurality of operations, and not movable with respect to the support portion in a second direction. The first direction intersects a front-and-rear direction of the work vehicle at an intersection point corresponding to a neutral position of the operating lever to form an acute angle with the front-and-rear direction on a rearward-outward side of the intersection point. The second direction is substantially perpendicular to the first direction. The operating switch part is arranged on the operating lever to perform a second operation other than the first operation among the plurality of operations.

In this configuration, dissimilar to the known operating device for performing the operations of a ripper by swinging the operating lever in the first and second directions, the operating lever according to the first aspect is not movable in the second direction, and the operating switch part is provided to perform the operation corresponding to the second direction. That is, the operating device according to the first aspect is configured with the combination of the operating lever movable in a predetermined direction (first direction) and the operating switch part arranged on the operating lever.

Here, the first operation can be the operation of upward and downward movement of a ripper of a bulldozer. The second operation can be the operation of tilt-in (frontward movement) and tilt-back (rearward movement) as the operation of frontward and rearward movement of a ripper of a bulldozer. In addition, the rearward and outward side relative to the front-and-rear direction of the work vehicle refers to a side rearward of the ripper operating lever and a side where an operator seat is not arranged relative to a line that passes through the position of the ripper operating lever and extends in the front-and-rear direction of the work vehicle. The wording "the first direction extends rearward and outward at an acute angle" refers to that a line representing the first direction and a line extending in the front-and-rear direction of the work vehicle form at an acute angle on the aforementioned the rearward and outward side. In addition, it is not necessary that the second direction substantially perpendicular to the first direction intersects the first direction at a precise right angle. The second direction can intersect the first direction in a range from 80 to 100 degrees, for example.

Although conventional operating levers are swingable in all directions and are insecure, the swinging direction of the operating lever according to the first aspect is restricted. For this reason, this operating lever can be also used as a support member that allows operators to hold their bodies. Therefore, even if an operator comes near losing balance due to external shocks and the like, the operator who comes near losing balance can be supported by the operating lever in the cab, which the operator grasps when operating the ripper. Consequently, it is possible to provide good operability, and in addition to this to allow an operator to operate the ripper with stable posture.

In a ripper operating device according to a second aspect of the present invention, in the ripper operating device according to the first aspect of the present invention, the second direction substantially matches with a direction in which a forearm of an operator of the work vehicle who grasps the operating lever extends when operating the ripper via the operating lever. In this configuration, the operating device is designed non-movable in a direction in that, when an operator who operates the work implement drives the vehicle with actuating the operating lever, the operator puts operator's weight.

Here, the direction in that the operator puts operator's weight refers to a direction that connects the operator and the operating lever, in other words, a direction substantially parallel to a forearm of the operator who grasps the operating lever.

Accordingly, even if an operator who operates the work vehicle such as bulldozer comes near losing operator's balance when driving the work vehicle with operating the work implement, since the operating lever does not swing in the direction in that the operator puts operator's weight, the operator can easily keep operator's balance in the cab.

In a ripper operating device according to a third aspect of the present invention, in the ripper operating device according to the first or second aspect of the present invention, the first operation is moving the ripper upward and downward. The second operation is moving the ripper forward and rearward.

Accordingly, operators can control the upward and downward movement, tilt-in, tilt-back and the like of a ripper installed on a bulldozer at good operability.

In a ripper operating device according to a fourth aspect of the present invention, in the ripper operating device according to the first or second aspect of the present invention, the support portion includes a restricting portion that restricts the operating lever from moving in the first direction.

In this configuration, a restricting portion is provided that can selectively restrict the swinging of the operating lever under a certain condition in the first direction in that the operating lever can swing.

Here, the aforementioned certain condition includes a case where a shock is applied to a main unit of a work vehicle that is driven with its ripper being operated by an operator so that the operator thrusts the operating lever in a direction in that the operator pushes the operating lever to bear the operator's weight, and the like, for example. An example of the aforementioned restricting portion can be provided by a detent groove that interlocks with the operating lever only when the operating lever is strongly thrust in the second direction in that the operating lever is non-movable, and the like. The aforementioned restriction of the swinging refers to restriction of the swinging of the operating lever only in a case of the aforementioned certain condition in the first direction in which the operating lever can swing in the normal condition.

Accordingly, for example, if an operator under operation of the ripper comes near losing operator's balance in the cab due to an external shock or the like, the operating lever which the operator grasps can be non-movable both in the first and second directions. Consequently, the operating lever can support the operator coming near losing operator's balance in the cab.

In a ripper operating device according to a fifth aspect of the present invention, in the ripper operating device according to the first or second aspect of the present invention, the operating switch part includes a plurality of operating switches aligned along a vertical direction of the work vehicle. In this configuration, as for operating switches that are arranged on the operating lever, a plurality of operating switches such as for upward and downward movement of the ripper are aligned along the vertical direction.

In this case, since the movement of the ripper and the layout of the operating switches agree with each other, it is possible to improve the operability for operators who operate the ripper. In addition, in the case where the operating switches are aligned along the vertical direction so that the distances from the thumb to the operating switches are the same when the operators grasp the operating lever, it is possible to improve the operability from the viewpoint of ergonomics.

DETAILED DESCRIPTION OF EMBODIMENTS

With reference to FIGS. 1 to 7, the following description will describe a bulldozer (work vehicle) 1 that includes a right-side operating device (ripper operating device) according to one embodiment of the present invention.

Overall Configuration of Bulldozer 1

Figure 1:
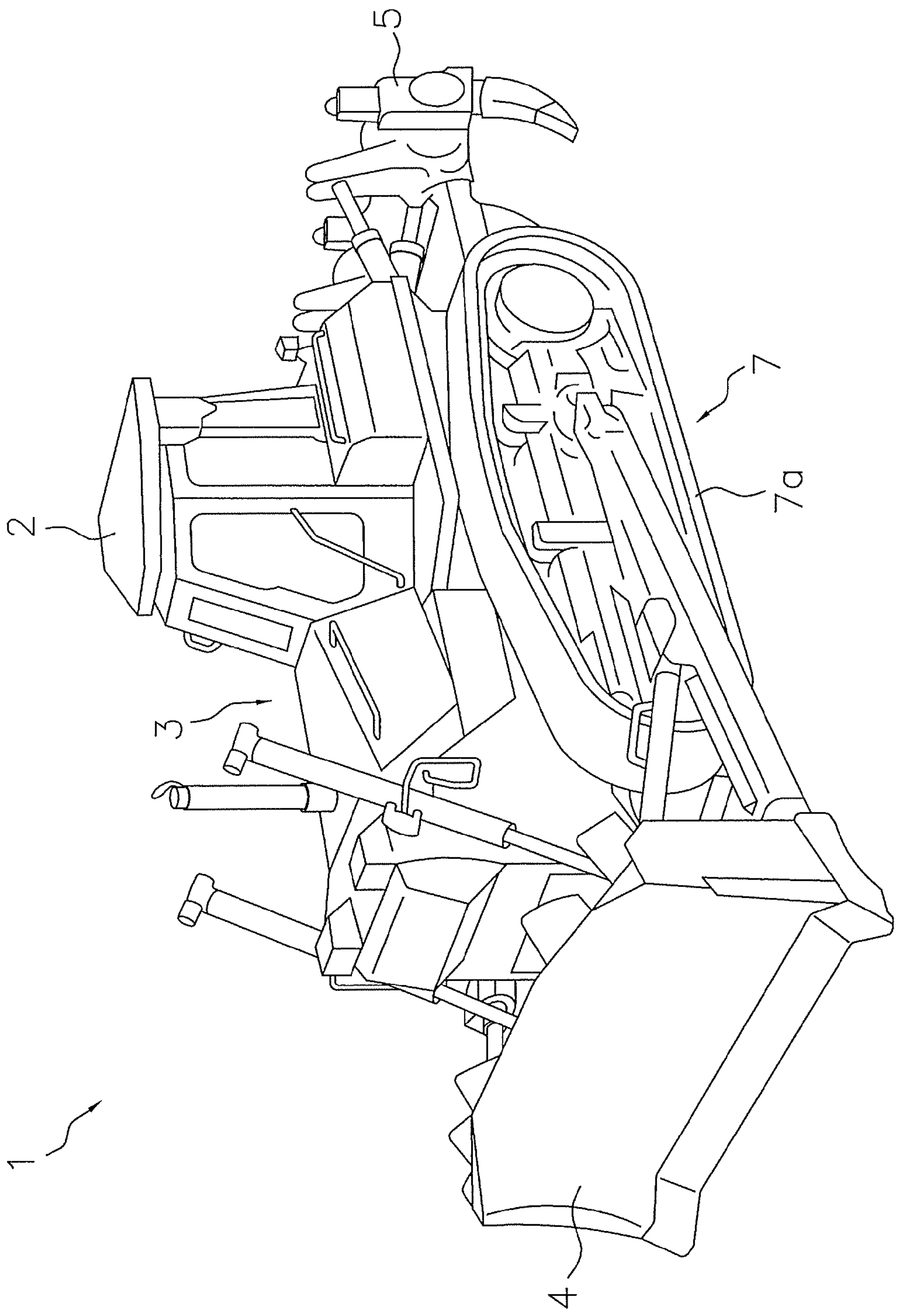
FIG. 1 is a perspective view showing the entire configuration of a bulldozer with a ripper operating device according to an embodiment of the present invention installed thereon.

The bulldozer 1 according to this embodiment is a construction machine that levels rough ground, and mainly includes a cab 2, a main unit frame 3, a blade 4, a ripper 5 and a traveling unit 7 as shown in FIG. 1.

Figure 2:
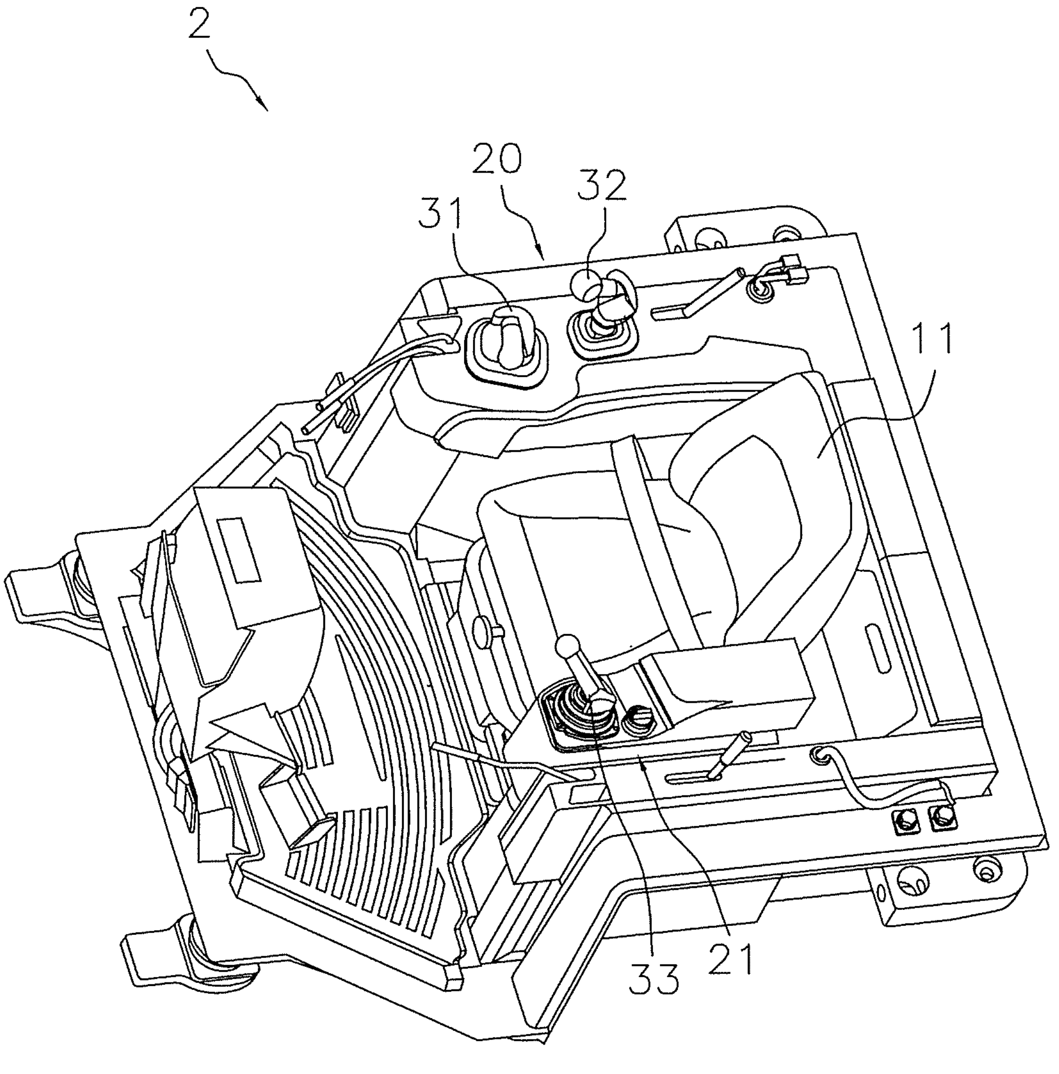
FIG. 2 is a perspective view showing the internal configuration of a cab installed on the bulldozer shown in FIG. 1.

The cab 2 includes an operator seat (driver seat) on which a driver (operator) sits, and levers, pedals, meters and the like for various operations (see FIG. 2). The configuration of the cab 2 will be described later.

A work equipment such as blade 4 and ripper 5, and the traveling unit 7 are mounted to the main unit frame 3. The cab 2 is installed on the upper part of the main unit frame 3.

The blade 4 is a work implement that is mounted to the front part of the main unit frame 3 to dig ground and to push soil forward. The blade 4 is driven by hydraulic cylinders by actuation of a blade operating lever 31 discussed later.

The ripper 5 is mounted to the rear part of the main unit 3. The tips of the ripper 5 as shank parts protrude downward substantially in the vertical direction. The ripper 5 rips or crushes a rock and the like by traction force of the traveling unit 7 with its shank parts penetrating the rock and the like. Also, similar to the blade 4, the ripper 5 is driven by hydraulic cylinders by actuation of a ripper operating lever (operating lever) 32 discussed later. Typically, the hydraulic cylinders include a lift cylinder that moves the ripper 5 upward and downward, and a tilt cylinder that moves the tips of the ripper 5 frontward and rearward.

The traveling unit 7 allows the vehicle to run on rough ground by rotation of a pair of endless crawler belts 7*a* that are mounted to right and left lower parts of the main unit frame 3.

Internal Configuration of Cab 2

An operator seat 11, right-side and left-side operating devices 20 and 21, and the like are arranged inside the cab 2 according to this embodiment as shown in FIG. 2.

Figure 7:
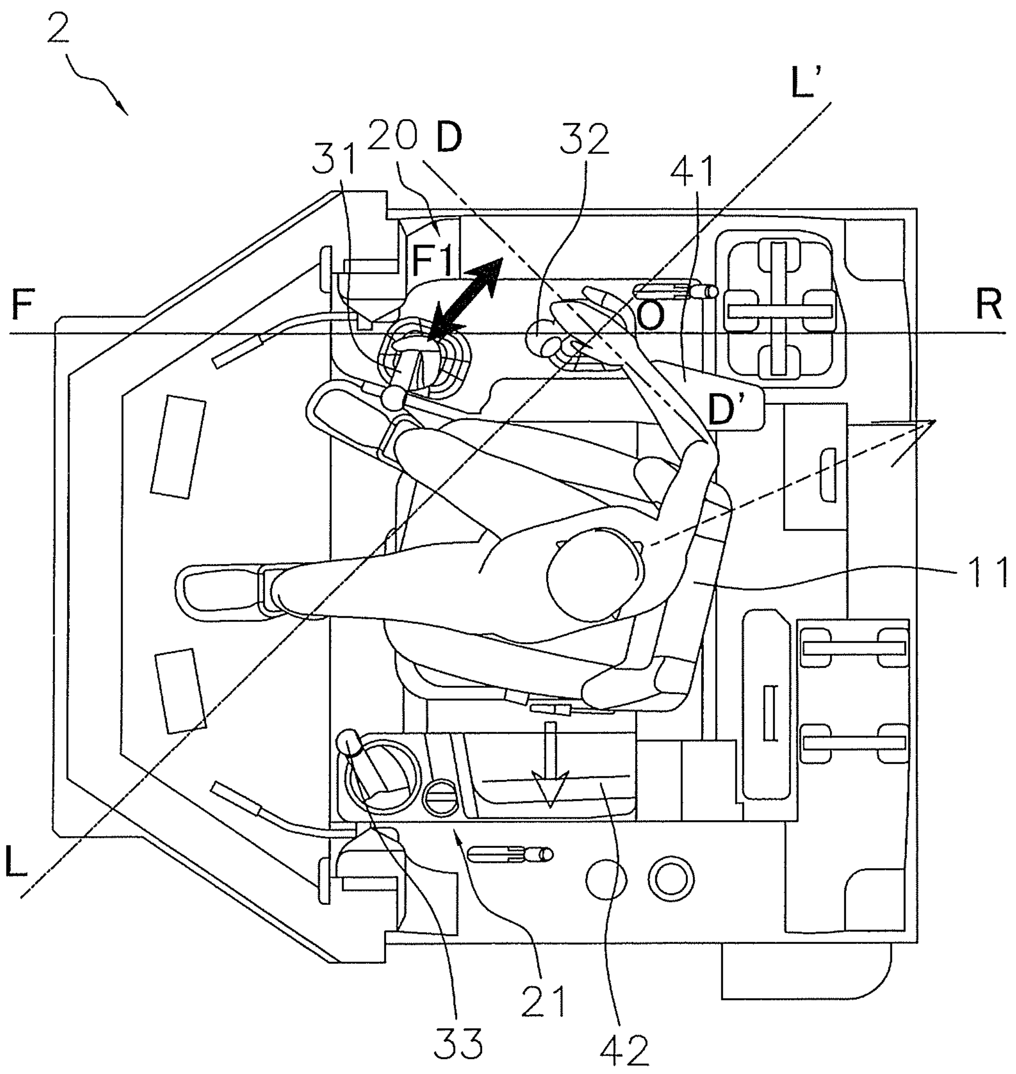
FIG. 7 is a plan view showing an operation state with an operator sitting on a seat in the cab shown in FIG. 2.

The operator seat 11 is a seat for driving operation. The driver who steps into/off the cab 2 sits on the operator seat 11 in driving operation. The operator seat 11 is mounted slidably in the front-and-rear direction. In addition, the operator seat 11 is mounted rotatably to improve the operability when the driver turns driver's body rearward to operate the ripper 5 or the like. FIG. 7 shows an operation state in that the operator operates the ripper 5 with the operator seat being rotated.

Operating equipment such as operating levers to be actuated by the driver is arranged on the right and left sides of the operator seat 11.

Figure 3:
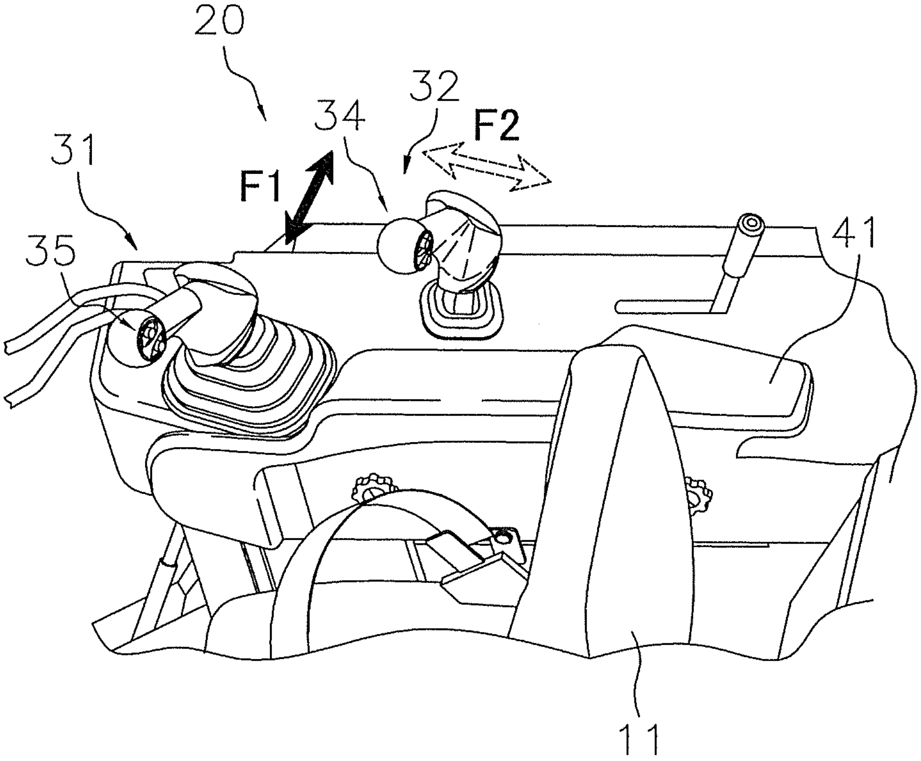
FIG. 3 is a perspective view showing the peripheral arrangement of an operating lever arranged in the cab shown in FIG. 2.

The right-side operating device 20 is arranged on the right side of the operator seat 11 from the viewpoint of the driver who sits on the operator seat 11, as shown in FIGS. 2 and 3. In addition, the blade operating lever 31, the ripper operating lever 32, an armrest 41 and the like are arranged on the upper surface of the right-side operating device 20. The configuration of the right-side operating device 20 will be described later.

Figure 4:
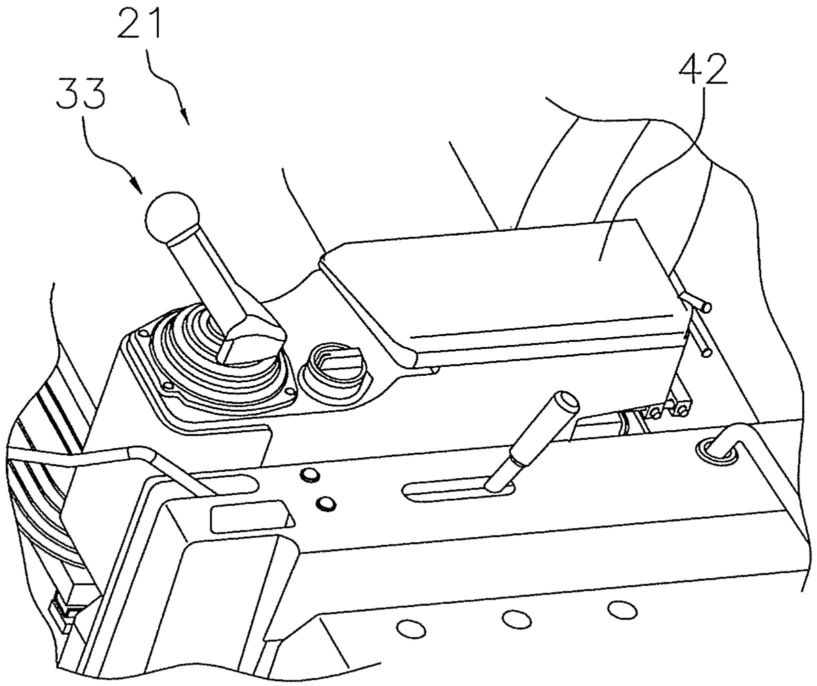
FIG. 4 is a perspective view showing the peripheral arrangement of the operating lever arranged in the cab shown in FIG. 2.

The left-side operating device 21 is arranged on the left side of the operator seat 11 from the viewpoint of the driver who sits on the operator seat 11, as shown in FIGS. 2 and 4. A steering operating lever 33, an armrest 42 and the like are arranged on the upper surface of the left-side operating device 21. The steering operating lever 33 swings (moves) for steering operation in the front-and-rear and right-and-left directions under definition in that the advancing direction of the vehicle is defined as the frontward direction, as shown in FIG. 7. As shown in FIG. 3, the armrest 42 has a bank part on the left edge so that the weight of the driver can be supported when the center of gravity of the driver moves leftward (see an open arrow in FIG. 7).

Configuration of Right-Side Operating Device 20

The right-side operating device 20 includes the blade operating lever 31 and the ripper operating lever 32, as shown in FIG. 3.

The blade operating lever 31 is a means for operating the blade 4 mounted to the front part of the bulldozer 1, and includes the tilt switches 35 on its end part. The tilt switches 35 include two switches that are aligned in the vertical direction. The tilt operation of the blade 4 is performed by pressing the switches.

Ripper Operating Lever 32

The ripper operating lever 32 is a means for operating upward and downward movement (first operation) and tilt-in/tilt-back (second operation) of the ripper 5 mounted to the rear part of the bulldozer 1. The ripper operating lever 32 includes a mechanism that allows the ripper operating lever 32 to swing in a first direction F1 but restricts swinging (moving) of the ripper operating lever 32 in a second direction F2 substantially perpendicular to the first direction F1 shown in FIG. 3. Here, as for the first direction in which the ripper operating lever 32 can swing, as shown in FIG. 7, the first direction refers to a direction (direction of L-L' line) that extends on a side rearward of the ripper operating lever 32 and a side where the operator seat is not arranged (outward side of the operator seat) at an inclination of acute angle relative to a line F-R that passes through the ripper operating lever 32 and extends in the front-and-rear direction of the bulldozer. That is, the first direction refers to a direction that brings an angle ROL' to an acute angle. The point O is the swing center (neutral position) of the ripper operating lever 32. The direction of a line D-D' (the second direction) perpendicular to a line L-L' substantially agrees with a direction in which driver's forearm extends when the driver grasps the ripper operating lever 32. The second direction can intersect the first direction in a range from 80-100 degree. Thus, the ripper operating lever 32 is non-swingable (non-movable) in a direction in which the driver puts driver's weight when extending driver's forearm to support driver's body against sway or the like during driving operation. For this reason, this operating lever can be also used as a support member that allows operators to hold their bodies. Therefore, even if an operator comes near losing balance due to external shocks and the like, the operator who comes near losing balance can be supported by the operating lever in the cab, which the operator grasp when operating the ripper. Consequently, it is possible to provide good operability, and in addition to this to allow an operator to operate the ripper with stable posture.

Figure 5:
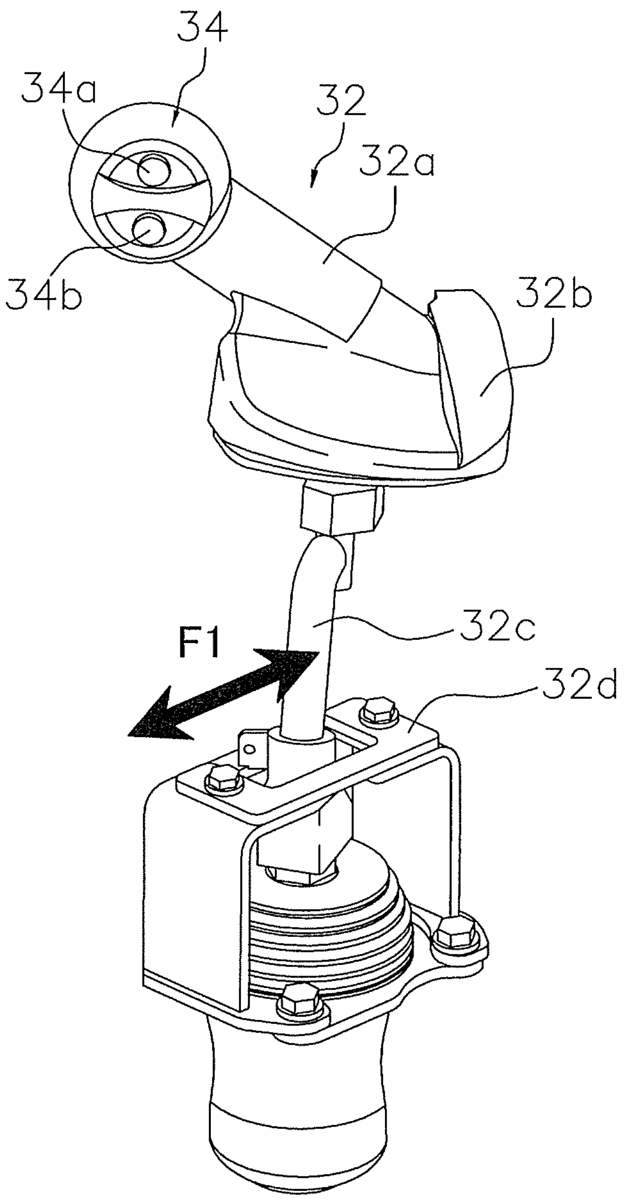
FIG. 5 is a perspective view showing the configuration of the operating lever arranged in the cab shown in FIG. 2.
Figure 6:
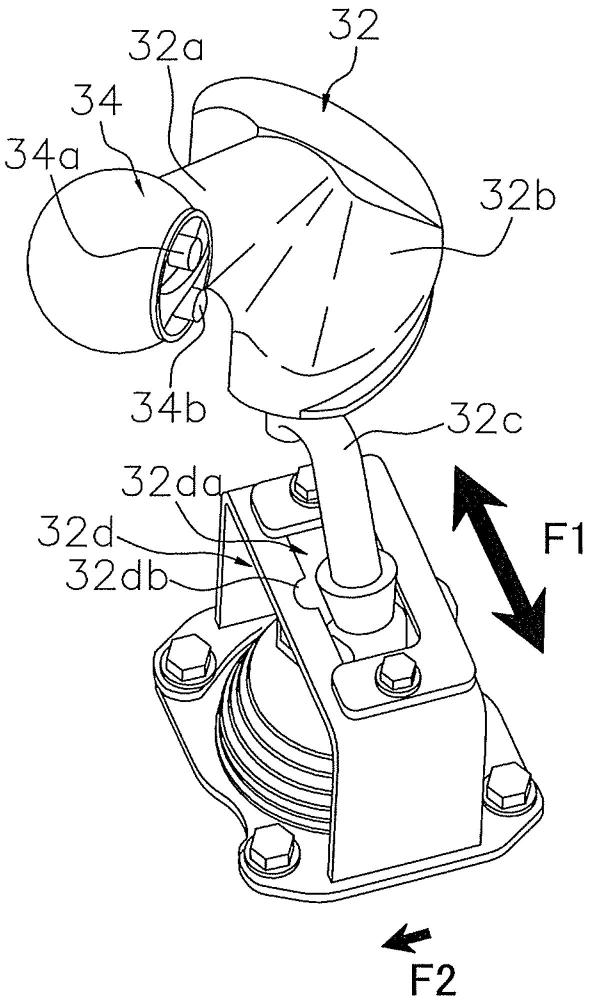
FIG. 6 is a perspective view showing the configuration of the operating lever arranged in the cab shown in FIG. 2.

Also, the ripper operating lever 32 includes a palm lever 32*a*, a palm rest 32*b*, an arm portion 32*c*, an arm guiding support portion 32*d* (support portion), and tilt switches (operating switch part) 34 arranged on its end part, as shown in FIGS. 5 and 6.

As shown in FIG. 5 or the like, the palm lever 32*a* is a substantially cylindrical member that extends from the palm rest 32*b* upward in a slanting direction. The palm lever 32*a* has a shape that allows the driver to easily grasp the palm lever 32*a* when the driver puts driver's forearm on the armrest 41.

As shown in FIGS. 5 and 6, the palm rest 32*b* is supported by the arm portion 32*c* from its lower surface side, and is connected to the base part of the palm lever 32*a*. Also, the palm rest 32*b* has a flat portion on which the driver puts driver's palm when grasping the palm lever 32*a*.

As shown in FIGS. 5 and 6, the arm portion 32*c* is a bar-shaped member that supports the palm rest 32*b* from the lower side. The arm portion 32 swings in the predetermined direction (first direction F1) along the longitudinal direction of a rectangular guide groove 32*da* formed in the arm guiding support portion 32*d* about one of two swing axes (not shown) extending perpendicular to each other in the lower part of the arm portion 32. A thrusting member strongly restricts the swinging of the arm portion about the other swing axis. A force required to actuate the ripper operating lever 32 in the first direction does not allow the ripper operating lever 32 to swing in the second direction F2. Thus, the arm portion 32*c* swings only in the guide groove 32*da*. Accordingly, the actuation direction of the ripper operating lever 32 can be limited to the first direction F1. The arm portion 32*c* is originally positioned at the center in a guide groove 32*da* discussed later. When an external force is applied to the arm portion 32*c* in the first direction F1, the arm portion 32*c* swings in the first direction F1. When the external force is released, the arm portion 32*c* returns to the original center position.

The arm guiding support portion 32*d* is a substantially U-shaped metal member. As shown in FIG. 6, the guide groove 32*da*, and a detent groove (restricting portion) 32*db* are formed on a surface of the arm guiding support portion 32*d* that extends in the horizontal direction. The guide groove 32*da* is a penetrating groove that extends along the aforementioned first direction F1. The guide groove 32*da* has a width slightly larger than the diameter of the arm portion 32*c*. Thus, the guide groove 32*da* plays a role in limiting the movement of the arm portion 32*c* into the first direction F1. As shown in FIG. 6, the detent groove 32*db* is a recessed portion that is recessed in proximity to the center of the guide groove 32*da* toward the second direction F2 substantially perpendicular to the first direction F1 in that the guide groove 32*da* extends. Thus, only when the driver pushes the ripper operating lever 32 with driver's arm to bear driver's weight and thrusts the ripper operating lever 32 in the second direction F2 with the driver grasping the ripper operating lever 32, for example, the arm portion 32*c* engages with the detent groove 32*db*. At this time, the swinging in the first direction F1 of the ripper operating lever 32 is also restricted. In this case, the swinging of the ripper operating lever 32 refers to the movement of the ripper operating lever 32 by actuating the ripper operating lever 32 at a relatively small force in the normal operation.

Thrusting the ripper operating lever 5 refers to the movement of the ripper operating lever 32 by a strong force that is applied to the ripper operating lever 32 by the operator who pushes the ripper operating lever 32 when the operator can bear operator's body with operator's arms and legs in a case where the work vehicle receives a shock or the like.

The tilt switches 34 include the tilt-in switch 34*a* and the tilt-back switch 34*b* that are aligned in the vertical direction. The tilt switches 34 adjust the tilt angle of the ripper 5 mounted to the rear part of the bulldozer 1. This adjustment of the tilt angle corresponds to the actuation in the second direction F2 of the known operating lever to be actuated in cross directions. That is, in this embodiment, the swinging is enabled in a particular direction (first direction F1) of the ripper operating lever 32, but the swinging of the ripper operating lever 32 is restricted in a direction (second direction F2) perpendicular to the particular direction. Therefore, reduction in operating function by the operating lever is avoided by the tilt switches 34 that serve as the operating function in the second direction F2 included in the known operation. In addition, the tilt-in and tilt-back switches 34*a* and 34*b* are aligned along the vertical direction so that the distances from operator's right thumb basal part are substantially the same when operator's palm is put on the palm rest 32*b*. Therefore, it is possible to provide switches with good ergonomic operability.

Driving Operation with Driver's Body being Turned Rearward

In this embodiment, when the driver looks back and drives the bulldozer 1 with looking at the ripper for operation of the ripper 5, as shown in FIG. 7, the driver's posture is inclined at 15 degrees clockwise by the aforementioned rotatable operator seat 11. The ripper operating lever 32 to be actuated by driver's the right hand swings only in a direction substantially perpendicular to an extension direction of the driver's right forearm (line D-D' in FIG. 7) put on the armrest 41.

As discussed above, in this embodiment, the swinging direction of the ripper operating lever 32 is limited into the first direction F1, and the tilt switches 34 arranged on the end part of the ripper operating lever 32 has the operating function corresponding to the operation in the second direction F2 of the known ripper operating lever.

Thus, when a shock is applied to the main unit of the bulldozer 1 during operation of the ripper 5, if the driver in the cab 2 comes near losing driver's balance, the ripper operating lever 32 grasped by the driver can be non-swingable in directions in that the ripper operating lever 32 is pulled or pushed by the driver. Although a member that supports the driver is arranged only on the left side in the known device, such a member can be arranged on the right side in addition to the left side. As a result, the driver in the cab 2 can easily keep driver's body balance. Also, the swing actuation with good operability performs the upward and downward movement operation of the ripper 5 that requires fine operation adjustment, while the switch actuation performs the tilt-in/tilt-back operation that does not require fine operation adjustment. Therefore, the operability of the ripper can be maintained as compared with the known ripper operating lever that performs both the operations by the lever actuation.

Features of Right-Side Operating Device 20

(1) As shown in FIGS. 3, 5, and 6, the right-side operating device 20 according to this embodiment includes the ripper operating lever 32 that can swing only in a predetermined direction (first direction F1) for upward and downward movement operation of the ripper 5 (first operation), and the tilt switches 34 that are arranged on the end part of the ripper operating lever 32 for tilt-in/tilt-back operation of the ripper 5 (second operation).

Accordingly, when the driver steps into the cab 2, and grasps and actuates the ripper operating lever 32, driver's body can be supported by the ripper operating lever 32 that can swing only in the particular direction. Thus, a member for supporting driver's body can be additionally arranged on the right side of the operator seat 11. As a result, even if the main unit of the bulldozer 1 receives sway or shocks when the bulldozer 1 runs with the ripper 5 penetrating ground, the driver in the cab 2 can operate the ripper 5 without losing driver's balance. Therefore, it is possible to improve the operability. Also, as for a function (tilt-in/tilt-back) reduced by limitation of the swinging direction of the ripper operating lever 32, this function is performed by the tilt switches 34 arranged on the ripper operating lever 32. Accordingly, the driver grasps one ripper operating lever 32 to be able to operate two operations of the upward and downward movement, and frontward and rearward movement.

(2) In the right-side operating device 20 according to this embodiment, as shown in FIG. 7, the guide groove 32*da* is formed so that the second direction F2 in that the ripper operating lever 32 cannot swing substantially agrees with the direction in which, when the operator in the cab 2 grasps the ripper operating lever 32, operator's arm extends (direction in that the driver puts operator's weight) (see the line D-D').

Accordingly, even if the driver in the cab 2 comes near losing driver's balance, since the ripper operating lever is non-swingable in the direction in which the driver puts driver's weight (second direction F2), the driver can stably operate the ripper 5 or the like in the cab 2 with keeping driver's balance.

(3) In the right-side operating device 20 according to this embodiment, as shown in FIG. 6, the detent groove 32*db* is formed beside the guide groove 32*da* so that the swinging of the ripper operating lever 32 is restricted in the first direction F1 in that the ripper operating lever 32 can swing in the normal condition.

Thus, in a case where the driver receives a shock in the cab 2, for example, when the operator bears operator's body with operator's arms and legs to keep operator's posture, the operator thrusts the ripper operating lever 32 against an urging member that restricts the swinging of the ripper operating lever 32 in the second direction F2 so that the arm portion 32*c* of the ripper operating lever 32 can be held in the detent groove 32*db*. That is, this can bring the ripper operating lever 32 into a non-swingable state in that the ripper operating lever 32 cannot swing in both the first and second directions F1 and F2. As a result, only in a condition where the driver in the cab 2 is expected to come near losing driver's balance, the arm portion 32*c* can be selectively brought non-swingable in the first direction F1 in that the ripper operating lever 32 can swing in the normal condition. Accordingly, the driver can be surely supported by the ripper operating lever 32 in the cab 2, and can more easily keep driver's balance.

(4) In the right-side operating device 20 according to this embodiment, as shown in FIG. 5, the tilt-in switch 34*a* and the tilt-back switch 34*b* included in the tilt switches 34 for the tilt-in/tilt-back operation of the ripper 5 are aligned in the vertical direction.

Since the tilt-in and tilt-back switches are aligned in the vertical direction in agreement with the conception of the tilt-in/tilt-back operation of the ripper 5, the driver can operate the ripper 5 without strange feeling. Also, since two switches 34*a* and 34*b* are arranged so that the distances of the switches 34*a* and 34*b* are substantially the same from operator's right hand thumb, which actuates the tilt switches 34, when the operator grasps the ripper operating lever 32, it is possible to further improve the operability of the ripper 5 in consideration of ergonomics.

(5) The right-side operating device 20 according to this embodiment performs the operations of the ripper 5 as a work implement mounted to the rear part of the bulldozer 1 as shown in FIG. 1.

There is a high probability that sway or shocks are applied into the cab 2 in work using the ripper 5 such as work in that the bulldozer runs with tips of the ripper 5 penetrating ground.

In operation of the ripper 5, there is a high probability that the driver loses driver's balance in the cab 2, since the driver turns driver's body rearward and drives the bulldozer 1 in the operation of the bulldozer 1. However, even in operation of the ripper 5, the ripper operating lever 32 can support driver's body.

(6) In the right-side operating device 20 according to this embodiment, as shown in FIG. 5, the upward and downward movement of the ripper 5 as an object to be operated is operated by the swinging of the ripper operating lever 32 in the first direction F1, and the tilt angle of the ripper 5 (frontward and rearward movement operation) is adjusted by the tilt switch 34.

Accordingly, the operator can actuate the ripper operating lever 32, the tilt switches 34 and the like in agreement with the operating conception of the work implement as an object to be operated.

(7) In the right-side operating device 20 according this embodiment, as shown in FIG. 2, etc., the ripper operating lever 32 is arranged in proximity to a position substantially right beside the operator seat 11.

Accordingly, even if the driver turns driver's body rearward and actuates the ripper operating lever 32 as shown in FIG. 7, it can be avoided that the distance is increased too much between the driver's arm on the actuation side and the ripper operating lever 32 as an object to be actuated. Since a predetermined operating lever is thus arranged in a proper position in the cab 2 in consideration of an actuation state, it is possible to further improve the operability.

OTHER EMBODIMENTS

The above description has described an exemplary embodiment according to the present invention. However, the present invention is not limited to the foregoing embodiment. Various changes and modifications can be made without departing from the spirit of the present invention.

(A) In the foregoing embodiment, it has been illustratively described that the detent groove 32*db* extends in a direction perpendicular to the guide groove 32*da* of the arm guiding support portion 32*d*, and is used as a restricting portion that selectively restricts the swinging of the ripper operating lever 32 in the first direction in which the ripper operating lever 32 can swing in the normal condition. However, the present invention is not limited to this.

For example, as the restricting portion that selectively restricts the swinging of the operating lever in the first direction, other means such as a mechanism other than the detent groove may be used that selectively restricts the swinging of the operating lever.

(B) In the foregoing embodiment, as shown in FIG. 7, it has been illustratively described that the swinging direction of the ripper operating lever 32 is limited into the first direction F1 that is specified in the state where the driver rotates the operator seat 11 rightward and turns driver's body toward the right and rear side. However, the present invention is not limited to this.

For example, even if the driver operates the ripper with turning driver's body on an operator seat that is not rotated and orientated in the front-and-rear direction, substantially the same effect can be provided.

(C) In the foregoing embodiment, it has been illustratively described that the upward and downward movement operation of the ripper 5 (first operation) is operated by the swinging of the ripper operating lever 32, and the tilt-in/tilt-back (second operation) is operated by the tilt switches 34. However, the present invention is not limited to this.

For example, the swinging actuation and the switching actuation may be changed to each other for these operations.

Even in this case, when the swinging direction and alignment of switches are specified in agreement with actual movement directions of the ripper or the like, the driver can operate the ripper or the like without strange feeling. However, fine adjustment operation in the tilt-in/tilt-back operation will be easily operated as compared with the upward and downward movement operation, which is opposite to the characteristic required in normal cases.

(D) In the foregoing embodiment, it has been illustratively described that the swing direction of the ripper operating lever 32 is specified by the direction in which the guide groove 32*da* extends. However, the present invention is not limited to this.

Other means may be used as a means for specifying the swing direction of the operating lever, for example, a mechanism for restricting the swing direction is arranged on the operating lever itself.

(E) In the foregoing embodiment, it has been illustratively described that the operating switches 34 are arranged along the vertical direction on the operating lever 32. However, the present invention is not limited to this.

For example, the operating switches may be arranged within a range accessible to operator's thumb when the operator grasps the operating lever with operator's right hand.

(F) In the foregoing embodiment, the present invention is applied to the ripper operating lever 32 included in the right-side operating device 20 installed in the cab 2 of the bulldozer 1. However, the present invention is not limited to this.

An operating device for a work implement according to the illustrated embodiment has an effect in that the operator can stably operate the work implement very well. Accordingly, the operating device can be applied to a ripper installed on a work vehicle such as bulldozer.

The invention claimed is:

1. A ripper operating device configured to perform a plurality of operations of a ripper installed on a rear side of a work vehicle, the ripper operating device comprising:

an operator seat movably coupled to the work vehicle;

a support portion coupled to the work vehicle so as not to move along with the operator seat;

an operating lever supported by the support portion so as to be movable with respect to the support portion in a first direction to perform a first operation among the plurality of operations and not movable with respect to the support portion in a second direction, the first direction intersecting a front-and-rear direction of the work vehicle at an intersection point corresponding to a neutral position of the operating lever to form an acute angle with the front-and-rear direction of the work vehicle on a rearward-outward side of the intersection point, the second direction being substantially perpendicular to the first direction and substantially matching with a direction in which a forearm of an operator of the work vehicle who grasps the operating lever extends when operating the ripper via the operating lever; and an operating switch part that is arranged on the operating lever to perform a second operation other than the first operation among the plurality of operations.

2. The ripper operating device according to claim 1, wherein the first operation is moving the ripper upward and downward, and the second operation is moving the ripper forward and rearward.

3. The ripper operating device according to claim 1, wherein the support portion includes a restricting portion configured to selectively restrict the operating lever from moving in the first direction.

4. The ripper operating device according to claim 1, wherein the operating switch part includes a plurality of operating switches aligned along a vertical direction of the work vehicle.

* * * * *